Inventors:
Mario Egi
Andrea Oso Novi
by: Michael S. Striker
Attorney

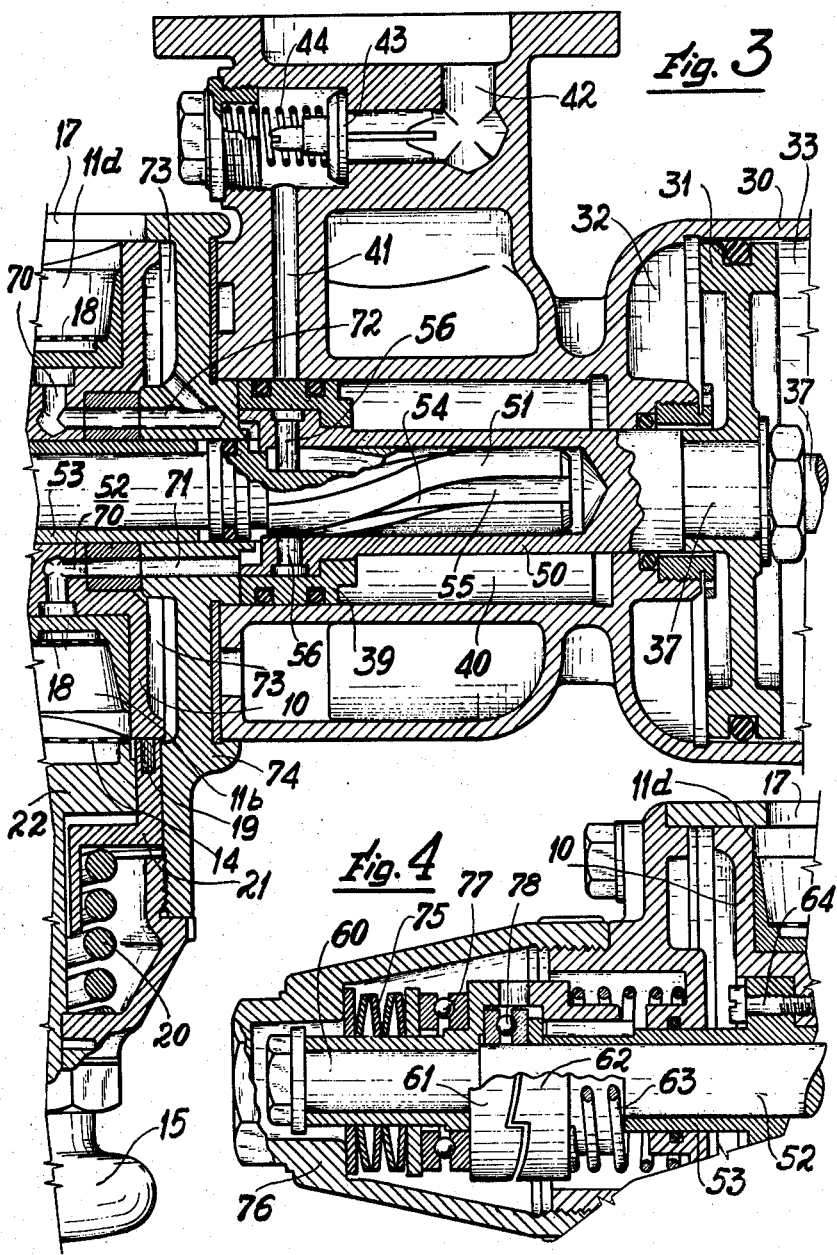

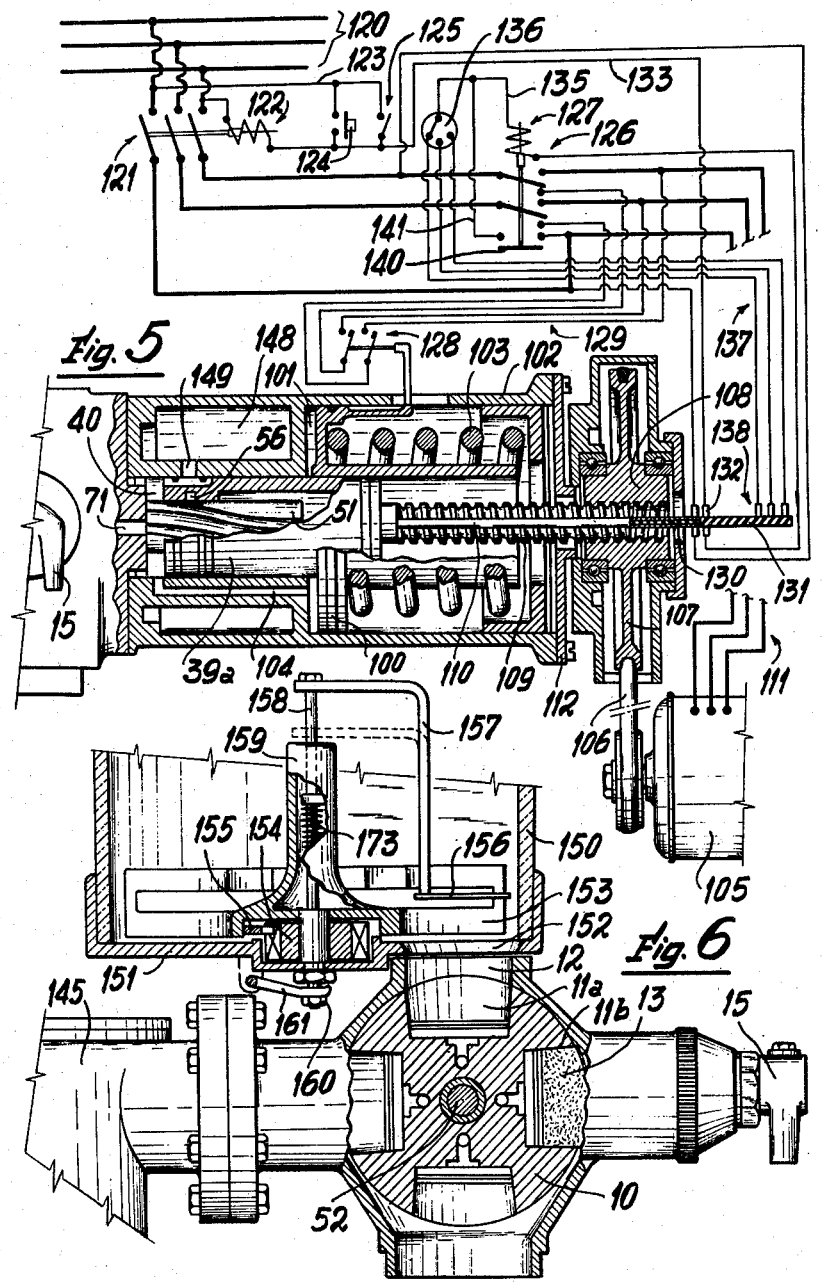

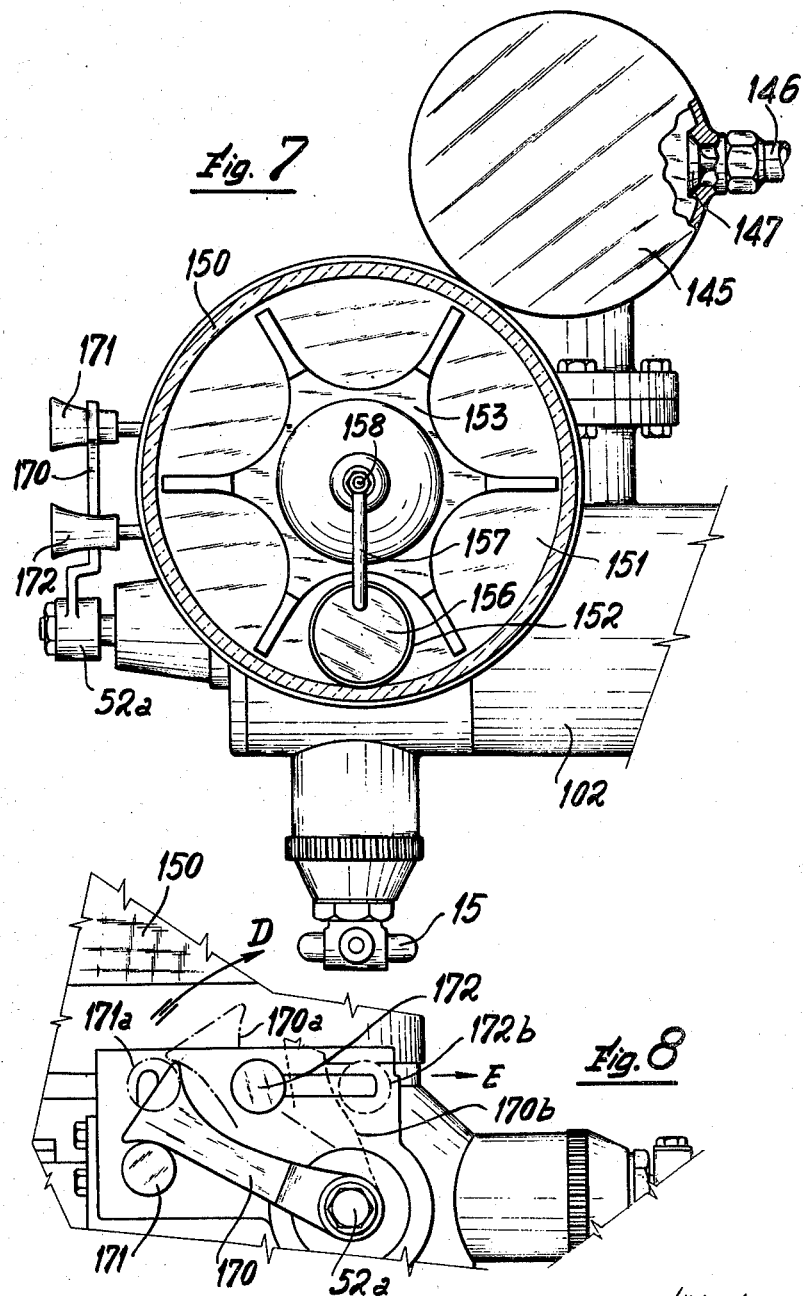

United States Patent Office 2,943,556
Patented July 5, 1960

2,943,556

COFFEE-MAKING APPARATUS

Mario Egi, 1 Via Montefeltro, and Andrea Ivo Novi, 63 Corso Buenos Aires, both of Milan, Italy Filed Feb. 19, 1958, Ser. No. 716,207

Claims priority, application Italy Feb. 19, 1957

3 Claims. (Cl. 99—289)

The present invention relates to a coffee-making apparatus and, more particularly, it is related to a coffee-making apparatus of the type designed to be made use of for producing and servicing coffee-drinks in cafeterias and other coffee-houses wherein large consumption of drinks is made, and wherein, therefore, coffee-machines or apparatuses capable of large drinks production are required, say in railways stations, game-fields and other locations wherein people meet, and so on.

The principal object of this invention is to provide a new and improved coffee-making apparatus of the so called "automatic type," i.e., including self-operating devices designed for automatically completing the cycle of operation required for producing the drink by causing a given amount of hot water to forcedly pass through a layer of toasted and ground coffee (generally referred as "coffee-filter" by those skilled in the art to which this invention appertains), and capable of better operation and larger and safer service than heretofore possible.

It is known that a number of automatic coffee-making apparatuses has been proposed and experienced. Such apparatuses include, in general, a rotatably supported member having a plurality of cavities evenly arranged thereabout, adapted to be intermittently rotated to successively carry each one of said cavities in at least a first position wherein a given amount of ground coffee may be loaded in said cavity to form the coffee-filter thereinto, then in a second position wherein the said cavity faces a perforated wall and wherein a given amount of pressurized hot water may be caused to forcedly traverse said coffee-filter, whereby the drink is formed, and then to pass through said perforated wall, impervious to the ground coffee, to proper outlets designed for pouring the drink into one or more cups located therebeneath, and then in a third position wherein water and/or steam currents may be made use of for removing the previously exploited ground coffee from said cavities. Further positions may be provided, according to the number of the coffee-filter forming cavities in said rotatable member, and wherein the said cavities may be subjected to further washing cleaning steps, and caused to dry prior to receive another amount of fresh ground coffee.

According to common knowledge, the intermittent rotational steps of said member is of amplitude corresponding to the angular interval between said cavities about said member, and the various devices and units of the apparatus are designed to cyclically operate in phase relationship with the movements of said member, so that while one of said loading, or drink forming, or exhausting steps is performed in one cavity, another of other steps of the cycle is performed in any other cavities in other of said positions.

In general, an apparatus of the type referred to above is provided, for causing the hot water to forcedly pass through the coffee-filter, with a pumping unit including a pumping piston having bore and stroke dimensional values such to supply through said filter a given amount of water, proportional to the amount of ground coffee comprised in the filter.

A more specific object of this invention is to provide a new and improved apparatus of the above character, wherein driving means are comprised for having the said rotatable member intermittently rotated by the reciprocation of the pumping piston.

A further object of this invention is to provide a new and improved apparatus as above, including operator controlled means to selectively modify the amount of hot pressurized water to be forcedly passed through the said filter at any cycle operation of the apparatus.

Another object of this invention is to provide a new and advantageous apparatus as above including operator controlled means adapted to initiate the cycle of operation and pumping piston controlled means capable of having the complete cycle of operation performed without further control of operator, and of causing the apparatus to automatically stop upon completion of said cycle.

The latter advantageous feature of the invention makes the apparatus of the invention particularly adapted to be combined with known controlling devices of the type designed to be activated upon introducing a coin into a properly located slot, for public service as a self-acting slot-dispenser of hot and freshly produced coffee drinks.

Other objects and advantages of the invention are in part obvious and in part will be made apparent as this description proceeds, and the features which are considered as new and characteristic of this invention will be set forth in particular in the appended claims.

The invention itself, however, both as to its construction and to its mode of operation, will be best understood from the following detailed description of two preferred forms of embodiment of the invention, when read in conjunction with the accompanying drawings, forming an essential component of this disclosure, and wherein:

Figure 3 illustrates in detail the portion indicated by numeral 3 in Fig. 1, and that, in said apparatus, includes the pressurized hot water feeding means;

Figure 1:
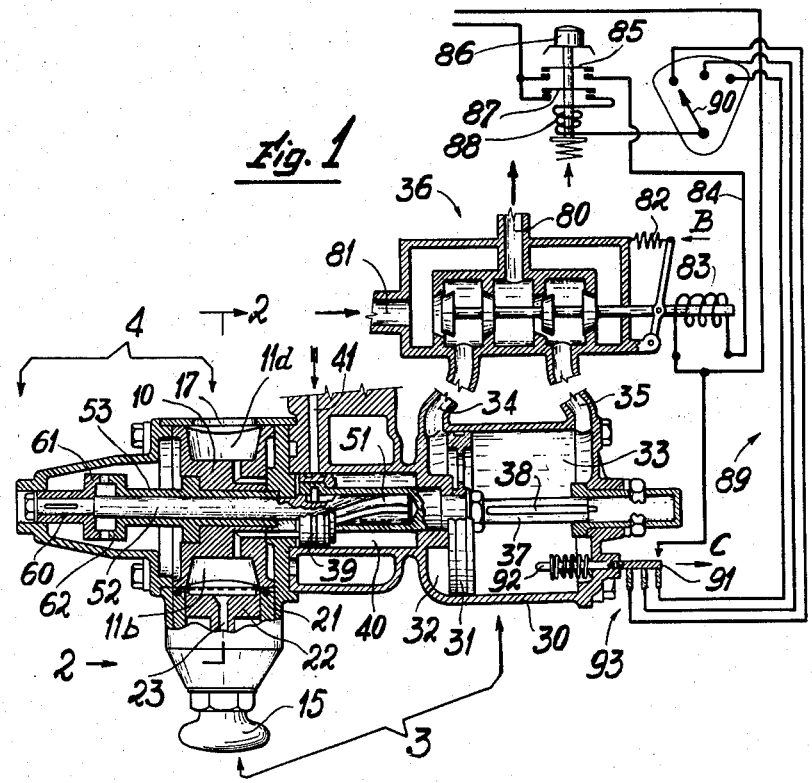
Figure 1 illustrates, in a rather simplified way and in longitudinal sectional view, along line 1—1 of Fig. 2, the complete operative assembly of an apparatus produced according to one form of embodiment of the invention, including a hydraulic motor for driving the various movable parts, and a circuitry, diagrammatically shown, for controlling said motor.
Figure 2:
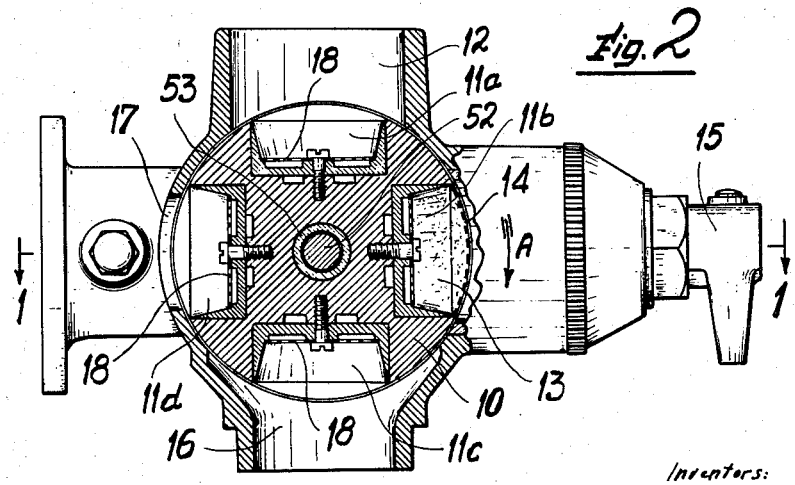
Figure 2 is a vertical sectional view of the rotatable member of the apparatus.

Figure 4 likewise illustrates the detail of a one-directional driving means compressed in the apparatus, in the portion 4 of Fig. 1;

Figure 5 illustrates a modified form of embodiment of the apparatus of Figs. 1 and 2, wherein an electric motor is provided for driving the various movable elements;

Figure 6 is a vertical cross-sectional view of a ground coffee supply and feeding means which may be advantageously applied to the apparatus of the invention;

Figure 7 is a plan elevation of same supply and feeding means, and

Figure 8 illustrates the detail of a form of embodiment of a device adapted for driving the means of Figs. 6 and 7 in phase relationship with the rotatable member of the apparatus of the invention.

Referring now to the drawings, wherein like reference numerals refer to like or equivalent parts, members and components in the several figures, and wherein the particulars of the minor structural details are omitted, as being comprised in the common knowledge of the art or easily conceivable by those skilled in the art:

As shown in the several figures, an apparatus constructed according to the invention comprises a drum-shaped rotatable member 10 provided with a plurality, namely with four radially out-facing cavities generally indicated by numeral 11, and referred with a letter related to the operative position thereof. Said drum member 10 is rotatably supported into a casing about an horizontal axis.

Summarizing the steps included in the cycle of operation of the apparatus, as it will be readily understood by a consideration of Fig. 2, one cavity—referred 11a—is upwardly directed beneath a passage 12 wherethrough a given amount of ground coffee may be cyclically fed into said cavity to form a coffee-filter thereinto; a second cavity 11b, already including the said filter, namely a layer 13 of ground coffee, is positioned in facing relationship with a perforated curved wall 14, permeable to the produced beverage and impervious to the ground coffee. The beverage is produced by forcing a given amount of hot water through said layer 13 and then from conventionally located outlets 15. A third cavity 11c is downwardly directed above a passage 16 for exhaustion of the exploited coffee, and the fourth cavity 11d is facing a passage 17, open to external, and in such location the cavity is allowed to dry.

The said drum member 10 is caused to intermittently rotate in the direction indicated by arrow A, performing at any phase of the cycle of operation a rotation of 90°, so that the various cavities will successively occupy any one of the above described positions, step-by-step.

As shown in Fig. 3, conventionally constructed gasket means 19 are provided about said perforated wall 14, and spring means 20 are further provided for urging a bearing member 21 for said gasket means 19 towards the cylindrical surface of said drum member 10, while the said perforated wall 14 is supported by a member 22 having a passage 23 (Fig. 1) for passage of the formed drink to the outlets 15.

In the form of embodiment of Figs. 1 to 4 inclusive, the movable components and members of the apparatus of the invention are driven by an hydraulic motor, which may be fed by any source of pressurized water or, eventually, by low pressure steam. Such hydraulic motor includes a two-stroke action unit including a cylinder 30 (Figs. 1 and 3) and a motor piston 31 reciprocably arranged in said cylinder and therefore forming a movable wall which divides the interior of said cylinder in two chambers or spaces 32 and 33 having end portions fluidly connected to a four-way magnetically controlled valve, generally indicated by reference numeral 36 in Fig. 1, via passages 34 and 35 respectively.

The said piston 30 is fixedly connected to a piston rod 37 which is slidably supported in the cylinder structure and prevented to rotate, for example by providing a longitudinal groove 38 (Fig. 1) in said rod, engaging with a conventionally arranged key in the cylinder structure. The said piston rod 37 is fixedly connected to or made integral with a pumping piston 39 correspondingly reciprocatable into a pumping cylinder 40, and embodying the hot pressurized water supply system of the apparatus.

In form of embodiment shown in Figs. 1 and 3, the diameter of motor piston 31 is noticeably larger than the diameter of pumping piston 39, for making possible the supplying the hydraulic motor with relatively low pressure fluids, say water from the town hydric supply, or from a roof tank, while the pumping system may pump hot water at the pressure required for proper production of the beverage, in general of 60 lbs./sq. in. about.

The hot water is fed from a conventional low pressure water-heater (not shown) through passages 41 and 42 including a poppet valve 43 (Fig. 3) loaded by a spring 44, the said passage 41 having an outlet in said cylinder 40 positioned to be uncovered by said piston 39 as soon as the same initiates its backward or aspiration stroke.

According to the invention, the reciprocating motion of said pumping piston 39 is for rotatively and intermittently driving the said drum member 10, for example by means of the mechanism shown in particular in Figs. 3 and 4. The said piston assembly including pistons 31 and 39 is arranged co-axial to said drum 10 and in the piston rod 50 of said pumping piston 39 a bore is provided for axial penetration of an extension 51 of a shaft 52, axially located and rotatably traversing said drum, into an outer tubular shaft 53, which is at its turn connected to said drum 10, say by means of bolts 64 (Fig. 4).

The said extension 51 is provided with grooves having a driving helical portion 54 and an end idle portion 55, wherein said grooves are parallel to the shaft axis. In their portion 54, said helical grooves develop a 90° turn about said axis. The length of said grooved extension 51 is greater than the amplitude of the maximum stroke of pumping piston 39, as required for pumping at each stroke the greater amount desired of water for producing a poorly concentrated drink, while the axial dimension of the helical portion of said grooves is smaller than the minimum stroke of same piston, as required for pumping through the coffee-filter a smaller amount of hot water, as required for producing a highly concentrated or "strong" beverage, through a coffee-filter including a like amount of ground coffee.

The said piston rod 50 is in helical meshing relationship with the said grooved extension 51 and therefore with the said shaft 52, for example by means of radial pins 56 connected to said rod and having an inner end portion slidably penetrating in said grooves 54, 55. From the above and by a consideration of Fig. 3 it will be readily understood that at any cycle of reciprocation of pumping piston 39 the said shaft 52 will be rotationally reciprocated 90°, provided that the amplitude of the stroke of said piston corresponds at least to said minimum stroke, and that by increasing the amplitude of said stroke from said minimum to said maximum the amplitude of the rotation of said shaft on the contrary does not increase, because the said pins 56 will idly run, as said minimum stroke is over, along the said idle end portion 51 of said grooves.

As it will be hereinafter described in detail, the above feature is provided for making the apparatus capable of producing at will beverages of differing concentration, i.e. consisting of differing amount of hot water forcedly passed through the coffee-filter, by modifying the amplitude of pumping piston's stroke, by acting on operator controlled adjusting means.

The rotary reciprocation of said shaft 52 is made use of for intermittently driving the drum member 10, as required for the operation of the apparatus, by one-directionally drivingly connecting said shaft to said drum, by any suitable ratchet means, adapted to drive the said drum 10 in direction A (Fig. 2) when the said piston 39 performs its backward or aspiration stroke, for carrying a coffee loaded cavity 11 from 11a to 11b, while during the subsequent pumping stroke of the piston the said drum is kept at standstill and the amount of hot water is forced through the layer or filter 13 in cavity 11b.

In Fig. 4 a possible embodiment of said one-directional driving device consists of two axially saw-toothed meshing members 61 and 62, connected to the end portion 60 of said shaft 52 and respectively splined to said tubular shaft 53. The member 62 is resiliently urged in meshing relationship with the mating member 61 by a spring 63, for example, and it is allowed to retreat, overcoming said spring, as the said shaft 52 rotates in direction opposite to A (Fig. 2). The noticeable frictional resistance of said drum to rotation within its casing and due to the various gasket means has been proved as largely more than enough for preventing any undue backward rotation of the drum.

The same rotation of drum 10 is made use of for having passages 70 (Fig. 3), having an outlet at the bottom of each cavity 11, wherein a perforated wall member 18 impervious to ground coffee is located, and an inlet on the side face of drum, facing the pumping system, successively brought in facing relationship with one passage 71 from pumping cylinder 40, to successively actuate a communication between said pumping system and the cavity at 11b, for the beverage producing step, and further in facing relationship with another passage 72, having an inlet in a chamber 73 on the side of said drum, and wherein steam may be supplied for heating the said drum, for fully cleaning and drying the cavity at 11b.

As shown in Fig. 3, the hub portion of one side face of said drum member 10 therefore acts as a slide rotary valve in respect to the facing flank 74 of the casing. The adherence between the mating surfaces of said parts is ensured by a spring means 75 (Fig. 4), shouldering on a hub covering cup-shaped member 76 connected to the casing and axially urging on the drum 10 through ball bearings 77 and 78.

The feeding of the described motor system and therefore the operation of the apparatus is controlled by a circuitry as shown in Fig. 1 and which at its turn controls the said four-way valve 36. The said valve 36 is connected at 81 to a supply of pressurized fluid and at 80 to an exhaust, and it is designed for alternatingly create a fluid communication between said supply and respectively said exhaust with the one and respectively the other end portion 32 and 33 of motor cylinder 30, via passages 34 and 35, respectively.

The movements and the positions of the inner spool of said valve 36 are controlled by a coil or magnet 83 cooperating with spring means 82. The said magnet 83 may be activated, causing the spool of valve 36 to rightwardly move (as shown) by pressing a push button 86 which, via a switch 85, completes the circuit 84 including the magnet. A push rod 92, slidably supported in and traversing a cylinder head member of cylinder 30, provided with an end portion 91 made of or coated with a conductive material and with an inner portion made of or coated with insulating material, is caused to move in direction C as said motor piston 31 in cylinder 30 terminates its backward or aspiration stroke.

The said switch 85 is further controlled by a magnet 88, activated via a circuit including a second switch 87, an operator controlled commutator 90 and a plurality of leads 89 in parallel connection between the various contacts of said commutator 90 and a corresponding plurality of contacts in electrical sliding connection with the end portion 91 of said push rod 92. Accordingly, as the said push button 86 is pressed by the attendant, the circuit 84 of magnet 83 is completed and it stays completed until the magnet 88 stays activated too, via its switch 87, concurrently closed, and one of leads 89 and one of contacts 93, as defined by the position of the arm of commutator 90.

The pressure exerted by attendant on the button 86 therefore causes the cycle of operation of the apparatus to initiate, with a rightward motion of motor piston 31, i.e. with an aspiration stroke of pumping piston 39 and concurrent rotation of 90° of drum 10, in direction A. Such motion proceeds even if the attendant does not keep the button 86 further pressed, until magnet 88 stays activated. When the piston 31 has its aspiration stroke completed, it urges said push rod 92 in direction C, causing the insulating portion thereof to engage the contact which, in the plurality of contacts 93, is actually included in the feeding circuit of magnet 88, via commutator 90.

At this point, the latter circuit becomes interrupted, deactivating magnet 88 and therefore causing both switches 85 and 87 to open. The magnet 83 becames deactivated too and the inner spool of valve 36 moves leftwards, causing the piston 31 to reverse its motion and therefore the pumping piston 39 to initiate its pumping stroke. As the latter stroke is completed, i.e. as said pistons have reached their most leftward position (as shown) the cycle of operation is completed and the apparatus stops, due to the fact that both switches 85 and 87 are open.

From what above it will be readily understood by those skilled in the art to which this invention appertains that the apparatus of the invention may be operator controlled by a plain and brief pressure exerted on a properly located push button, and that, without further attention of attendant, the apparatus is capable of automatically completing its own cycle of operations, and to restore its initial condition as such cycle is completed, preparatory to a next cycle, upon further pressure to be exerted by attendant on button 86.

It will be further readily understood that the above described useful feature of the invention might be advantageously made use of for providing the apparatus—if desired—with a conventionally designed slot-type device, for having the action on button 86 substituted by the introduction of a proper coin into a slot. Such feature makes the apparatus of the invention specially adapted for servicing in railways or bus stations and in other places wherein people might directly attend for having the beverage dispensed.

In certain cases an hydraulic motor as described might be however subject to some objections, say for poor disposal of pressurized water. In such case the modified form of embodiment of the invention, as shown in Fig. 5, may be advantageously made use of. In said modified construction the units including the drum member 10 and the various above described mechanisms for having the said drum 10 intermittently rotated upon reciprocation of the pumping piston are constructed as hereinbefore disclosed and, therefore, such components of the structure of the invention will not be further explained. In Fig. 5 the members corresponding to the ones of Figs. 1 to 4 inclusive are accordingly referred by like numerals.

Referring now to Fig. 5, there is shown an elongated pumping piston 39a reciprocatable in pumping cylinder 40, helically connected, as above described, to the grooved extension 51 of the drum shaft, and further slidably arranged in an axial passage of an outer auxiliary annular piston 100, which at its turn is reciprocatable in the interior 101 of an outer cylinder 102, co-axial to cylinder 40. The said auxiliary piston 100 is urged leftward by a spring 103 and the interior 101 of said cylinder 102 is provided with a fluid connection to the cylinder 40, via a passage 104.

The resiliency of spring 103 is chosen, in relation to the surface of annular piston 100, to balance an hydraulic pressure corresponding to the most convenient pressure at which the hot water must be pumped through the coffee-filter for proper production of a flavoured beverage; therefore, if during the pumping stroke of piston 39a in cylinder 40 the pressure actually raises over its most convenient value, the auxiliary piston 100 is caused to retreat and a small amount of water is temporarily recovered in cylinder 101, thus keeping said pressure levelled at a given value. Of course, said small amount of water will successively and immediately be pumped through the coffee-filter too under action of spring 103.

The above described feature makes it possible to drive the pumping piston 39a by means of motor means of power excess to the power strictly required, to ensure the proper service of the apparatus, and designed to drive the pumping system at a substantially constant rate, while the pumping pressure is safely kept levelled, even if the resistance encountered by water in passing through the coffee-filter may not be obviously kept uniform. The said feature of the invention makes it possible, therefore, to drive the various mechanisms of the apparatus by making use of an electric motor, as shown at 105 in Fig. 5.

The said motor 105 is drivingly connected to said pumping piston 39a via mechanisms including a transmission V belt 106, a driven pulley 107 rotatably supported co-axially to piston 39a and having a screw-threaded hub portion 108, and a screw-threaded rod 109 screwly engaging with said hub 108, co-axial and connected to or made integral with said piston 39a. The said rod 109 and consequently the said piston 39a are prevented to rotate, say by splining said rod 109, provided with at least one longitudinal groove 110, to a member of the structure of the device, say to the cylinder head forming plate 112.

The reciprocation of piston 39a is performed by reversing the direction of rotation of motor 105 upon completion of the rightward aspiration stroke, by means of an inverter switch included in the feeding circuit 111 of said motor, as it will be described hereinbelow.

Also the said modified form of embodiment of the invention features any one of the advantageous facilities of operation and service of the construction of Figs. 1 to 4 inclusive, in view of the operation of the particular circuitry forming an important component of such modified embodiment of the invention, and connected to a suitable source 120 of current, namely a three-phase network supply.

Said circuitry includes a magnetically controlled primary switch 121 operated by a first control magnet or coil 122 activated via a circuit 123 including an operator controlled push button switch 124. Preferably, another operator controlled lever switch 125 is connected in parallel to switch 124 to complete the circuit 123 for an extended period of time when it is desired to operate the apparatus continuously, as required say for extensive production of beverages. The said feeding circuit 111 of motor 105 is connected to said primary switch 121 via a magnetically controlled inverter switch 126, controlled by a second control coil 127. The leads included in said circuit 111 are directly connected to the contacts which, in said inverter 126, are designed to be engaged when the motor rotates in direction such to cause the rightward aspiration stroke of pumping piston 39a, while same leads are connected to the other contacts, of same inverter, to be engaged for reversing the direction of rotation of motor 105, in series connection to the contact of another switch 128, controlled by said auxiliary pressure limiting piston 100, via a circuit 129.

The control coils 122 and 127 are both pumping piston controlled for automatic operation of the apparatus. A rod having a conductive portion 130 and an insulating end portion 131 is fixedly connected to said screw-threaded rod 109 and therefore reciprocated together with pumping piston 39a. The first control coil 122 may be activated either via the said operator controlled circuit 123 including switches 124 and 125 and via another piston controlled circuit including a lead 133 and a contact 132 positioned to engage with said rod 130, 131 on its insulating portion 131 but very near to its conductive portion 130, when the piston is at its resting leftward position, as shown. Therefore, supposing that a temporary pressure is being applied by attendant to button switch 121, the first control coil 122 is activated and the primary switch 121 closed, causing the motor to start and piston 39a to initiate its rightward aspiration stroke. As soon as such stroke is initiated, the said contact 132 engages the conductive portion 130 of said rod, and the said coil 122 becomes further activated via a circuit including the said contact 132 and leads 133 and 134. Therefore the said primary switch 121 is kept closed, even if the said button switch 124 is released by attendant, until the piston 39a terminates its two-stroke cycle of operation at its resting leftward position shown.

Of course, the operation of said button switch 124 to initiate the cycle of operation of the apparatus of the invention might be substituted by the operation of a conventionally constructed and connected coin operated device, if desired.

The direction of rotation of motor 105 is automatically reversed when the rightward aspiration stroke of pumping piston 39a is completed, by the activation of control coil 127 of inverter switch 126, via a circuit including a lead 135, an operator controlled commuter 136, one lead of a plurality of leads 137 connected in parallel to the contacts of said commuter, one contact of a corresponding plurality of contacts 138, spacedly located along and engaging to said rods 130, 131, and a return lead 139. The said activation occurs as the conductive portion 130 of said rod engages the contact that, in the several contacts 138, is connected to the contact which, in said commuter 136, is engaged with the movable arm thereof, therefore connected to lead 135.

According to what above, it will be apparent that the above described modified form of embodiment may be easily adapted by the attendant for production of beverages of differing concentrations too, by properly operating the said operator controlled commuter 136 to select the position at which, upon completion of a minimum of distance traveled by pumping piston 39a during its rightward aspiration stroke, the direction of motor 105 would be reversed to initiate the leftward pumping stroke.

Mechanically connected to the movable equipment of inverter 136 there is another switch means 140 in parallel circuit with circuits 137, via lead 141. This latter switch is closed as said control coil 127 is activated, and its circuit 141 concurrently activates and keeps activated same coil, when the pumping stroke of piston brings the said conductive portion 130 far from contacts 138, for completion of said pumping stroke until to the initial position shown.

The auxiliary piston controlled switch 128 and the parent circuit 129 actuate a safety device directed to prevent a continuous feeding of motor 105 if the pumping 39a cannot reach its said initial position or, anyway, if the pressure in pumping cylinder grows too high, for obstructions that might occur in coffee-filter or in the various passages. Such switch and circuit are connected in series connection with the feeding circuit 111 of motor, only in the branch thereof designed to feed the motor for rotation as required to perform the said leftward pumping stroke, and said switch is mechanically connected to its controlling auxiliary piston 100 for causing the opening thereof when said piston 100 is caused to retreat upon an overpressure occurring in pumping cylinder. If desired, the said mechanical connection may be constructed and adjusted for having the said safety switch open only when the said piston retreats over a given stroke interval, larger than the average stroke interval which may be considered as not jeopardizing the current service of the apparatus.

In the form of embodiment shown in Figs. 5 and 7 a modification of the hot water feeding system is shown. Said system includes a relatively small high pressure water heater, consisting of a tank 145 connected to a low pressure water supply line 146, via a puppet valve 147 (Fig. 7). In the said tank 145 conventionally constructed sources of heat, say electric resistors (not shown) are arranged. The said tank 150 is in fluid communication with an annular chamber 148 (Fig. 5) surrounding the said pumping cylinder 40 and which communicates with said cylinder via a passage 149, corresponding to passage 41 of the form of embodiment of Figs. 1 and 3. The said tank 145 is kept full of water, during the service of the apparatus. As the pumping piston performs its aspiration stroke, an amount of hot water is sucked from tank 145 and a corresponding amount of cold water penetrates in same tank, via puppet valve 147, from the supply duct 146. When the pumping piston, on the contrary, performs its pumping stroke, the pumping pressure is transmitted within the tank 145 too, but the water is prevented by puppet valve 147 to return in the supply.

The volume of tank 145 is obviously chosen such that the water contained and heated thereinto will be not appreciably cooled by the amounts successively received from supply 146. A volume of ¾ or of one gallon has been proved adapted for having the thermal status of water in tank 145 leveled as required for proper service of the apparatus.

In Figs. 6 to 8 an improved and useful ground coffee feeding device is shown, the said device being advantageously made use of in combination with any of the forms of embodiment of the invention, as above described.

Such ground coffee feeding system includes a vase 150, preferably made of transparent material, say of glass, designed to contain a supply of ground coffee, and having a flat circular bottom wall 151 including an opening 152 near its bordering. The said vase is positioned above the apparatus so that its opening 152 is vertically located over the said ground coffee inlet passage 12 over the drum member cavity in loading position.

Just above the upper surface of said bottom wall 151 an armed member 153 is rotatably supported, co-axially to said vase; the said member is shaped, as it will be readily understood by a consideration of Fig. 7, in particular, to successively carry amounts of ground coffee over the said opening 152 when subject to a properly timed intermittent rotation about its axis. Said armed member 153 is rotatable with respect to a stationary saw-toothed pinion 154, the latter having as many teeth as the number of arms on the member 153, and the pinion 154 being engaged by a conventionally constructed ratchet means 155 on the member 153.

Above the said opening 152 a vertically reciprocable disk-shaped ground coffee pressing member is supported by an arm 157 connected to a rod 158 slidably arranged in the axis of said member 153 in an upwardly extended hub portion 159 thereof. The lower end portion 160 of said rod 158 is connected to suitable means, say a small lever 161, adapted for controllably lowering said rod and therefore said disk-shaped coffee pressing member 156 towards said passage 12.

It will be readily understood that by properly timing a downward stroke of said disk-shaped member 156 above said opening 152, when the said armed member 153 is at rest, an amount of coffee will be positively caused to drop inside the under-positioned coffee-filter forming cavity 11a. The provision of the described ancillary device of the apparatus is designed to overcome any possible missing or irregular feeding of ground coffee in the drum cavities, as it might sometimes occur, say for moisture or excessive constipation of the ground coffee, if such feeding would be related on gravity only.

The operation of said intermittently rotating and axially reciprocating members 153 and 156, respectively, may be controlled by the described rotary reciprocation of shaft 52 of drum member. For example, as shown in Figs. 7 and 8 an arm lever 170 may be connected to an end portion 52a of said shaft (traversing a properly bored hub forming member of the type illustrated at 76 in Fig. 4) for cooperation with knobs 171 and 172 both connected to said lever 161 and a spring 173 may be arranged in hub portion 159 for upwardly urging the said rod 158 and therefore the said disk-shaped pressing member 156, as shown in Fig. 6.

Upon rotation in direction D of said arm lever 170 till as indicated at 170a (Fig. 8), the said knob 171 is allowed to move where indicated at 171a, permitting the disk-shaped member 156 to be raised by spring 173 into the position shown in Fig. 6, and when the lever 170 is rotated into the position 170b, it will move the second knob 172 in the direction indicated by the arrow E and into the position 172b to thereby turn the hub 159 and the ratchet means 155 of Fig. 6 with respect to the pinion 154, causing the said armed member 153 to perform one of its rotational steps.

While the invention has been heretofore described and shown but in few forms of embodiment thereof, it is intended that the invention is not limited to the very details shown, and that said details should not be taken as restrictive of the invention, as it is obvious that various modifications in design may be resorted to by those skilled in the art to which this invention appertains, without departing from the spirit and the scope of the invention, as defined in and by the appended claims.

Without further analysis, the foregoing will so fully reveal the gist of this invention that others can, by applying current knowledge, readily adapt it for various applications in apparatuses for the application considered, without omitting features that, from the standpoint of prior art, fairly constitute characteristic of the invention and, therefore such adaptations should and are intended to be comprehended within the range of equivalents thereof.

Having thus described the invention, what is claimed as new and desired to have protected by Letters Patent is:

1. In an automatic coffee-making machine having a plurality of work stations, in combination, a rotatable drum formed with a plurality of coffee-making cavities circumferentially spaced on said drum for consecutive indexing alignment with said plurality of work stations, at least one of said work stations being arranged for coffee making; a pump cylinder; passage means connecting said pump cylinder with said coffee-making work station; a piston member axially reciprocable in said cylinder for supplying water to a coffee-making cavity in alignment with said coffee-making work station; a reciprocably rotatable drive member; connecting means for engaging said drum to said drive member for joint movement during rotation of said drive member in one direction, and for disengaging said drive member from said drum during rotation of said drive member in the other direction of the reciprocating rotation thereof; and cam means on one of said piston and drive members and extending on said one member in the axial direction of said piston member over at least the length of the stroke thereof, said cam means having a helical portion and a straight portion extending axially, and cam follower means on the other one of said members and engaging said cam means for actuating reciprocating rotation of said drive member synchronous with the axial reciprocating movement of said piston member, whereby during one of the strokes of said piston member said drum is rotated in one direction while said cam follower means engages said helical cam means portion, and during engagement of said cam follower means with said straight cam means portion and during the other stroke of said piston member said drum stands still.

2. In an automatic coffee-making machine having a plurality of work stations, in combination, a rotatable drum formed with a plurality of coffee-making cavities circumferentially spaced on said drum for consecutive indexing alignment with said plurality of work stations, at least one of said work stations being arranged for coffee making; a pump cylinder; passage means connecting said pump cylinder with said coffee-making work station: a piston member axially reciprocable in said cylinder for supplying water to a coffee-making cavity in alignment with said coffee-making work station; a reciprocably rotatable drive member; connecting means for engaging said drum to said drive member for joint movement during rotation of said drive member in one direction, and for disengaging said drive member from said drum during rotation of said drive member in the other direction of the reciprocating rotation thereof; cam means on one of said piston and drive members and extending on said one member in the axial direction of said piston member over at least the length of the stroke thereof, said cam means having a helical portion and a terminal straight portion extending axially, and cam follower means on the other one of said members and engaging said cam means for actuating reciprocating rotation of said drive member synchronous with the axial reciprocating movement of said piston member; and adjusting means for adjusting the stroke of said piston member for varying the length of movement of said cam follower means in engagement with said straight cam means portion, whereby the quantity of water supplied from said cylinder to a coffee-making cavity may be adjusted without varying the angular displacement of said drum while the same is rotated in one direction during one of the strokes of said piston member, said drum standing still during the other stroke of said piston member.

3. In an automatic coffee-making machine having a plurality of work stations, in combination, a rotatable drum formed with a plurality of coffee-making cavities circumferentially spaced on said drum for consecutive indexing alignment with said plurality of work stations, at least one of said work stations being arranged for coffee making; a pump cylinder; passage means connecting said pump cylinder with said coffee-making work station: a piston member axially reciprocable in said cylinder for supplying water to a coffee-making cavity in alignment with said coffee making work station; a reciprocably rotatable drive member; connecting means for engaging said drum to said drive member for joint movement during rotation of said drive member in one direction, and for disengaging said drive member from said drum during rotation of said drive member in the other direction of the reciprocating rotation thereof; helical cam means on one of said piston and drive members, and cam follower means on the other one of said members and engaging said helical cam means for actuating reciprocating rotation of said drive member synchronous with the axial reciprocating movement of said piston member, coffee supply means for supplying coffee to a coffee-making cavity in alignment with another one of said work stations, said coffee supply means including transport means movable for transporting coffee to said other work station; coupling means for engaging said drive member to said transport means for joint movement during rotation of said drive member in one direction, and for disengaging said drive member from said transport means during rotation of said drive member in the other direction of the reciprocating rotation thereof; and transfer means for transferring coffee from said other work station to a coffee-making cavity of said drum aligned with said other work station, said transfer means being connected to said drive member for movement synchronous with the movement of said drive member, whereby during one of the strokes of said piston member said drum is rotated in one direction, and during the other stroke of said piston member said drum stands still and said coffee supply means are intermittently actuated synchronous with the movement of said piston member.

References Cited in the file of this patent

UNITED STATES PATENTS

| | | |
|---|---|---|
| 1,805,159 | Bauer et al. | May 12, 1931 |
| 2,014,325 | Grilli | Sept. 10, 1935 |
| 2,392,452 | Baumann | Jan. 8, 1946 |

FOREIGN PATENTS

| | | |
|---|---|---|
| 445,247 | Italy | Feb. 10, 1949 |
| 509,257 | Italy | Jan. 13, 1955 |
| 510,478 | Italy | Jan. 21, 1955 |
| 1,118,772 | France | June 11, 1956 |
| 761,523 | Great Britain | Nov. 14, 1956 |